June 6, 1950 D. H. CAMPBELL ET AL 2,510,681

RADIO APPARATUS

Filed June 21, 1946 9 Sheets-Sheet 1

Inventors
Dudley H. Campbell
William J. Larkin
by Emery, Booth, Townsend, Miller & Weidner Attys

RADIO APPARATUS

Inventors:
Dudley H. Campbell
William J. Larkin
by Emery, Booth, Townsend, Miller & Weidner Attys June 6, 1950 D. H. CAMPBELL ET AL 2,510,681

RADIO APPARATUS

Filed June 21, 1946 9 Sheets-Sheet 3

Inventors
Dudley H. Campbell.
William J. Larkin.
by Emery, Booth, Townsend, Miller & Weidner
Attys

RADIO APPARATUS

Filed June 21, 1946 9 Sheets-Sheet 4

Inventors:
Dudley H. Campell.
William J. Larkin,
by Emery, Booth, Townsend, Miller & Weidner
Attys June 6, 1950 D. H. CAMPBELL ET AL 2,510,681

RADIO APPARATUS

Filed June 21, 1946 9 Sheets-Sheet 5

Inventors:
Dudley H. Campbell,
William J. Larkin,
by Emery, Booth, Townsend, Miller & Weidner
Attys

RADIO APPARATUS

Filed June 21, 1946 9 Sheets-Sheet 6

Inventors:
Dudley H. Campbell
William J. Larkin.
by Emery, Booth, Townsend, Miller & Weidner
Attys.

RADIO APPARATUS

Filed June 21, 1946 9 Sheets-Sheet 7

Inventors
Dudley H. Campbell
William J. Larkin
by Emery, Booth, Townsend, Miller & Weidner Attys

RADIO APPARATUS

Filed June 21, 1946

Inventors
Dudley H. Campbell,
William J. Larkin
by Emery, Booth, Townsend, Miller & Weidner Attys

RADIO APPARATUS

Filed June 21, 1946

Inventors:
Dudley H. Campbell,
William J. Larkin.
by Emery, Booth, Townsend, Miller & Weidner Attys Patented June 6, 1950

2,510,681

UNITED STATES PATENT OFFICE 2,510,681

RADIO APPARATUS

Dudley H. Campbell, Wakefield, and William J. Larkin, Lynnfield, Mass., assignors to National Company, Inc., Malden, Mass., a corporation of Massachusetts Application June 21, 1946, Serial No. 678,226

20 Claims. (Cl. 174—52)

This invention relates to radio apparatus and in particular to a cabinet for housing such a mechanism as a radio receiver, and the object is to provide a sturdy cabinet for housing a mechanism of that nature wherein it will be readily accessible for inspection, servicing or repair as required and which can be manipulated easily and safely.

The arrangement in particular provides for compactly housing a mechanism of the type referred to of substantial size and which might be considered as, at most, semi-portable. It has been found particularly useful in installations on ships which may be rolling or pitching when it is necessary to have access to the mechanism refered to so that it is desirable that the parts be firmly held in the various positions which they may assume and be capable of firm manual control as they are moved from one position to another. The features of construction whereby such desirable results are attained will be referred to as the description proceeds and will be further understood therefrom.

Our invention will be well understood by reference to the following description of the illustrative embodiment thereof shown by way of example in the accompanying drawings. In these drawings representing a cabinet for housing a radio transmitter and receiver the various elements forming portions of the electronic system have generally been omitted. Furthermore, to avoid confusion many of the figures show merely certain of the parts, adjacent parts being omitted. We have not attempted in the following brief description of the figures of the drawings to characterize or refer to such omissions as they will be obvious to one familiar with the reading of drawings.

Figures 18, 18A, 19, 20, 21:
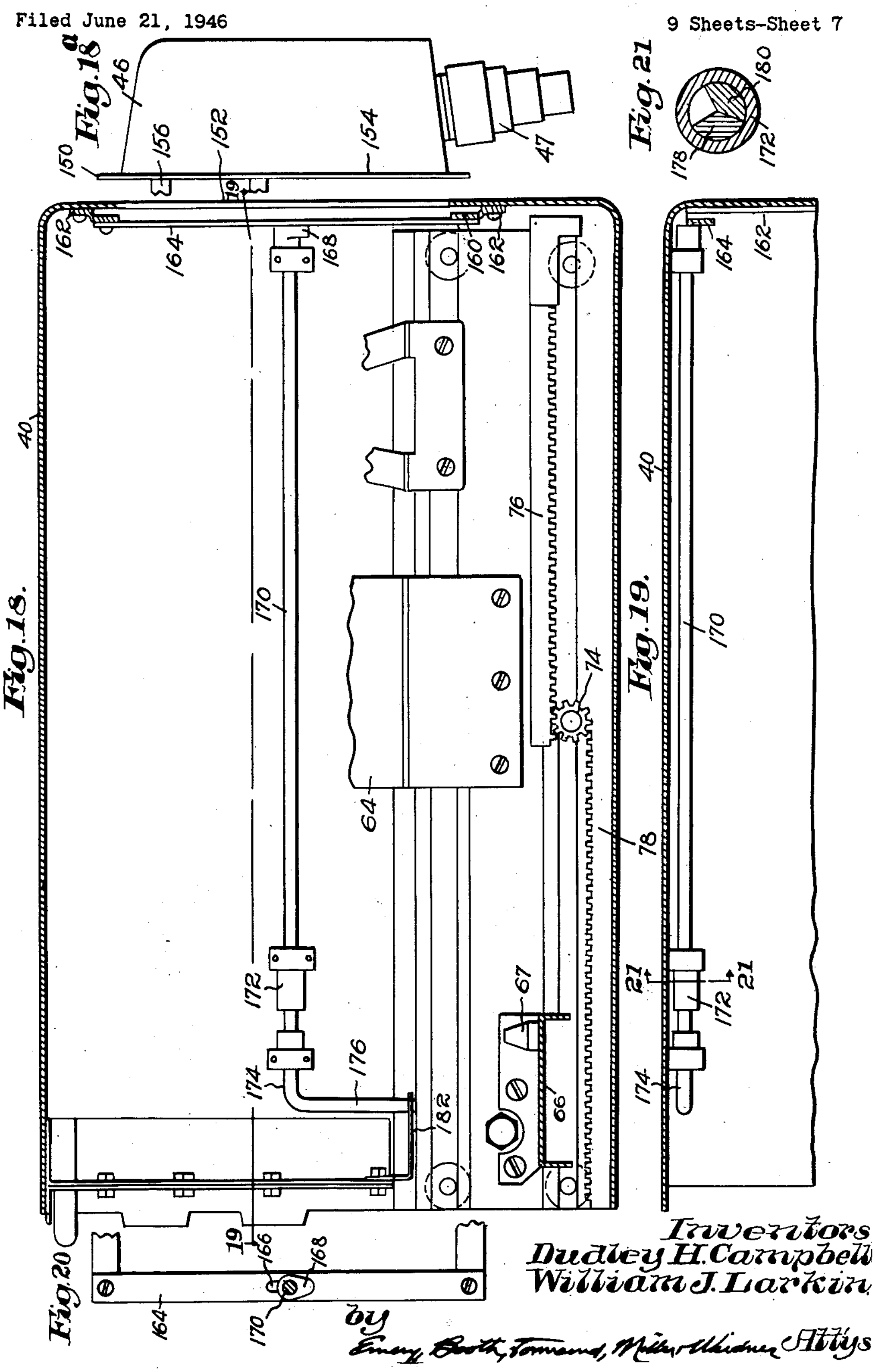
Fig. 18 is a longitudinal section taken in a vertical plane just inwardly of the further wall of the casing, the auxiliary casing or "blister" being omitted.
Figures 22, 23:
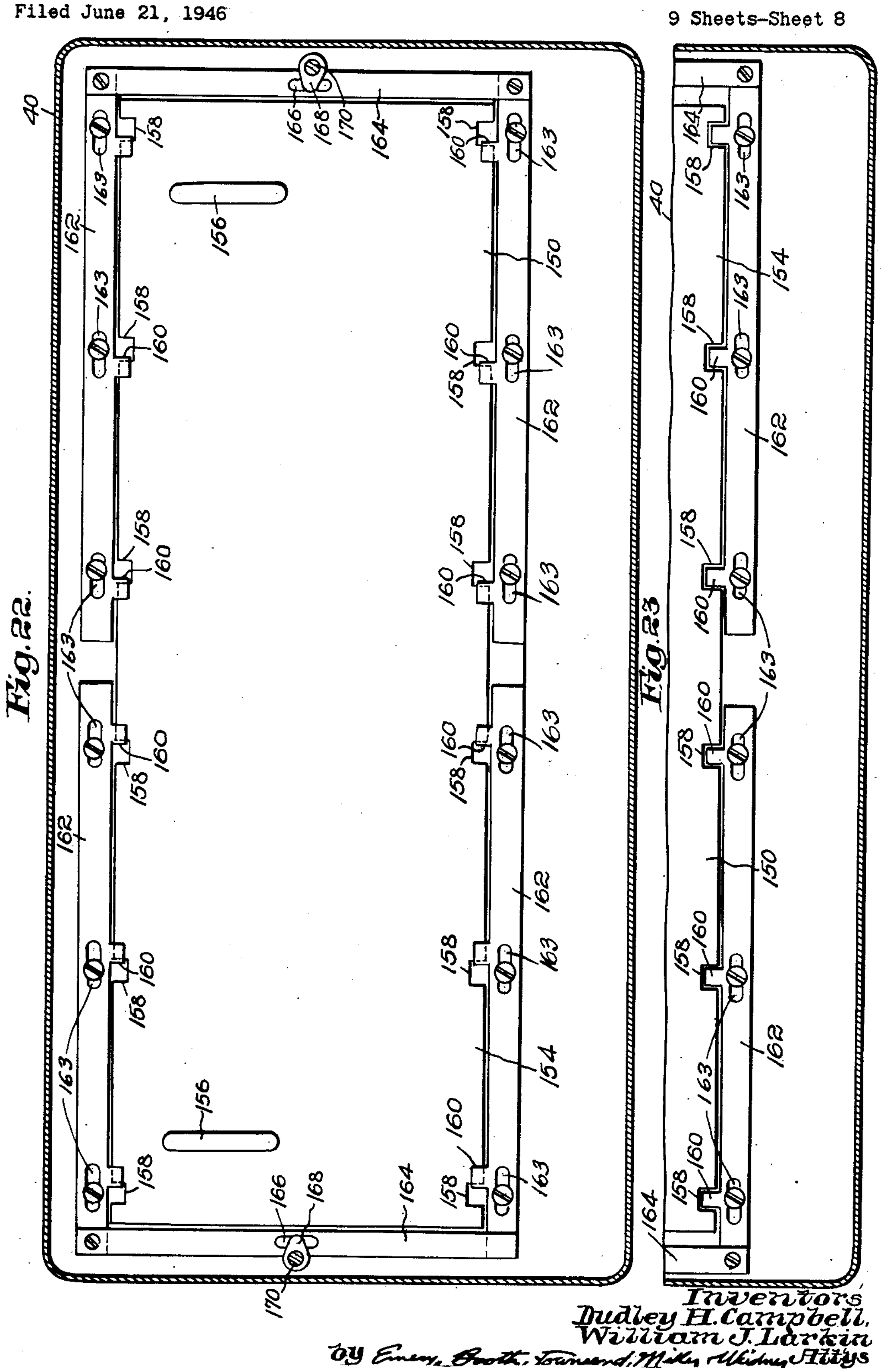
Figure 24:
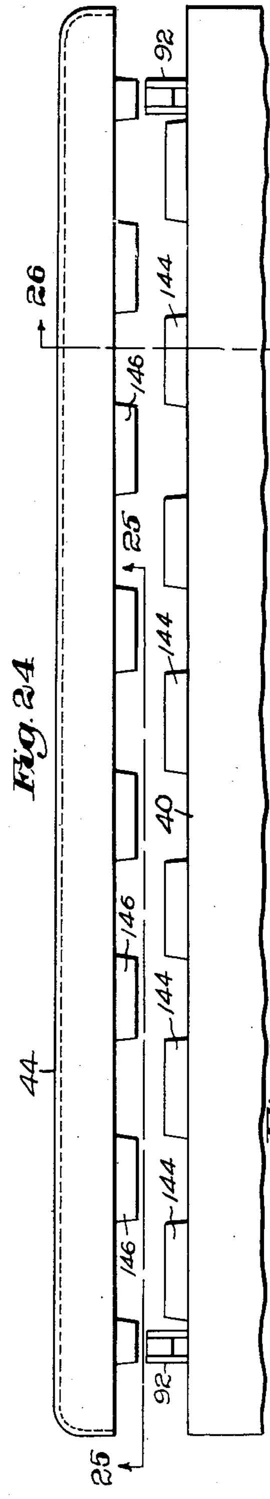
Figures 26, 27:
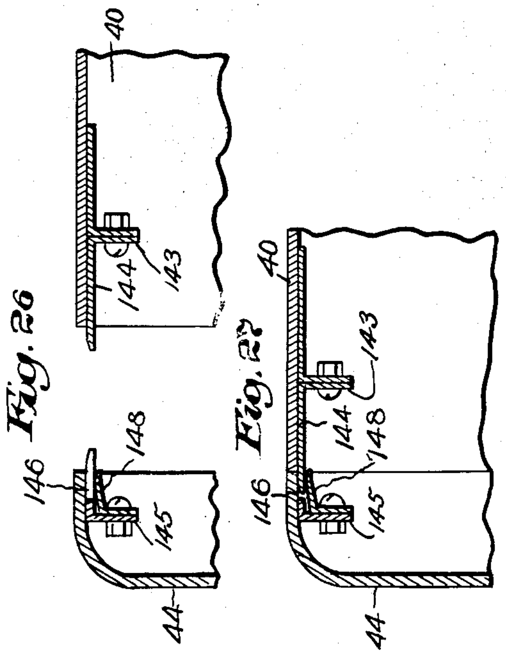
Figure 25:
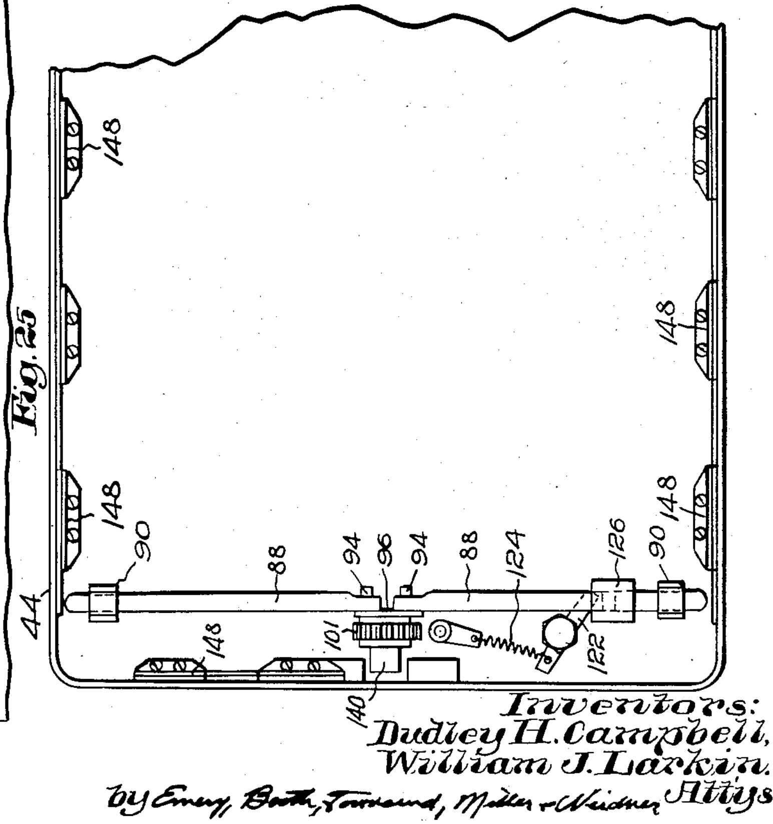

Fig. 18*a* is a side elevation partly broken away of the "blister" which, relative to Fig. 18, is shown adjacent the position which it occupies when assembled with the casing;

Fig. 19 is a section on the line 19—19 of Fig. 18;

Fig. 20 is a fragmentary detail chiefly in elevation illustrating the parts which are located at the upper right-hand corner of Fig. 19;

Fig. 21 is a section on an enlarged scale on the line 21—21 of Fig. 19;

Fig. 22 is a transverse section of the cabinet proper just forwardly of its rear wall;

Fig. 23 corresponds to the lower part of Fig. 22 and shows the parts in a different position of adjustment;

Fig. 24 is a top plan view of the front end of the cabinet showing the panel slightly withdrawn from the casing;

Fig. 25 is a rear elevation of a portion of the panel as seen from the line 25—25 of Fig. 24;

Fig. 26 is a section on the line 26—26 of Fig. 24; and

Fig. 27 is a similar view showing the parts closed together.

Figures 5, 6:
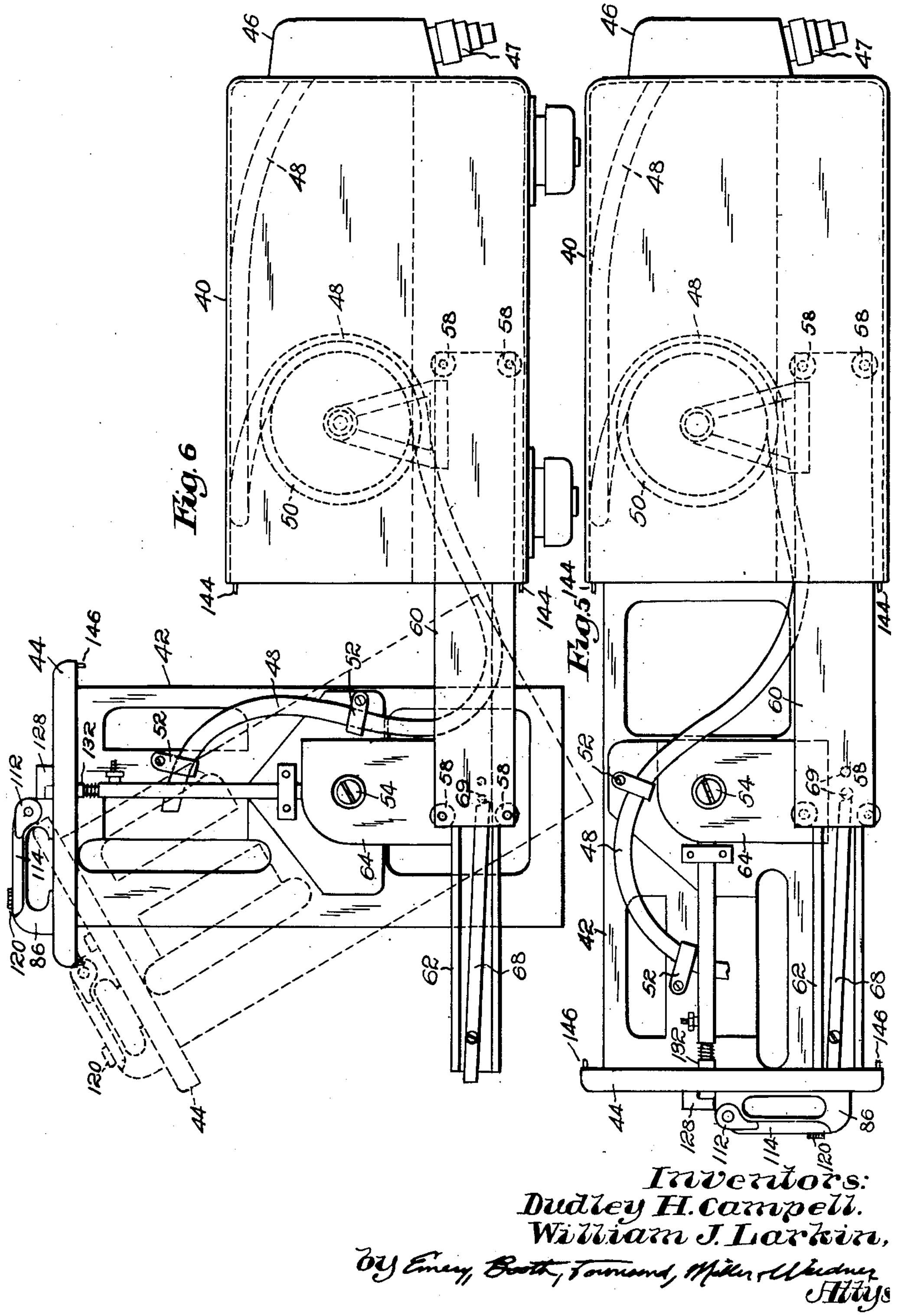
Fig. 5 is a side elevation on a smaller scale showing the chassis withdrawn from the cabinet proper.
Fig. 6 is a similar view showing the chassis tilted.

Before proceeding to a detailed description of the drawings, a brief preliminary outline may facilitate understanding. In general the construction resembles a drawer of the so-called slide type commonly used in filing cabinets and (see Figs. 2 and 5) comprises a casing 40 corresponding to the drawer casing. The chassis 42 of the radio mechanism telescopes therein in the manner of the drawer proper and the casing is closed by the front panel 44 of the radio mechanism which as usual mounts various control mechanisms and indicating instruments and which corresponds to the drawer front and which projects, as seen in Fig. 6, around the chassis as is common in certain types of drawers. As in the slide type of drawer, the chassis may be entirely withdrawn from within the casing 40 to a supported position exterior of the casing, as illustrated in Fig. 5.

In the embodiment of the invention shown an auxiliary casing 46 is mounted at the rear end of the casing 40. This auxiliary casing is colloquially termed a "blister" and, for convenience, that word will be used when it becomes necessary to refer to it in the detailed description. Herein the blister is secured over an opening in the rear wall of the casing 40, the parts being shown separated in Figs. 18 and 18*a*, the blister being shown in Fig. 18*a* in a position relative to the casing in Fig. 18 corresponding to a slight displacement of the blister to the right from the position it would occupy if assembled with the casing 40.

Electric conductors lead to the mechanism in the cabinet through the rear and in the present instance may be attached by suitable couplings (not shown) to nipples 47 carried by the wall of the blister (which in the case of the particular construction illustrated contained electric filtering devices) and from the front or inner face of which the various electric conductors are led, grouped into two cables 48, one at each side of the casing. These cables 48 may be supported along the inner side of the top or ceiling of the cabinet to a point adjacent the front thereof, as indicated in Figs. 5, 6, 7 and 8, and then are looped in planes near the side walls about pulleys 50 which serve to control the slack of the cables in a manner to be described as the chassis is moved in and out. The cables are clamped by clamps 52 to the sides of the chassis at points adjacent the centers 54 on which it is trunnioned for movements between the positions illustrated in Figs. 5 and 6, as hereinafter more fully described, and extend hence to suitable banks or gangs of connectors from which the various wires lead to mechanisms carried by the chassis or panel. No attempt has been made to show the last mentioned connections in the drawings. For the purpose of understanding the construction under consideration we might consider that the cable ended at the point 52.

Figures 7, 8, 9, 10:
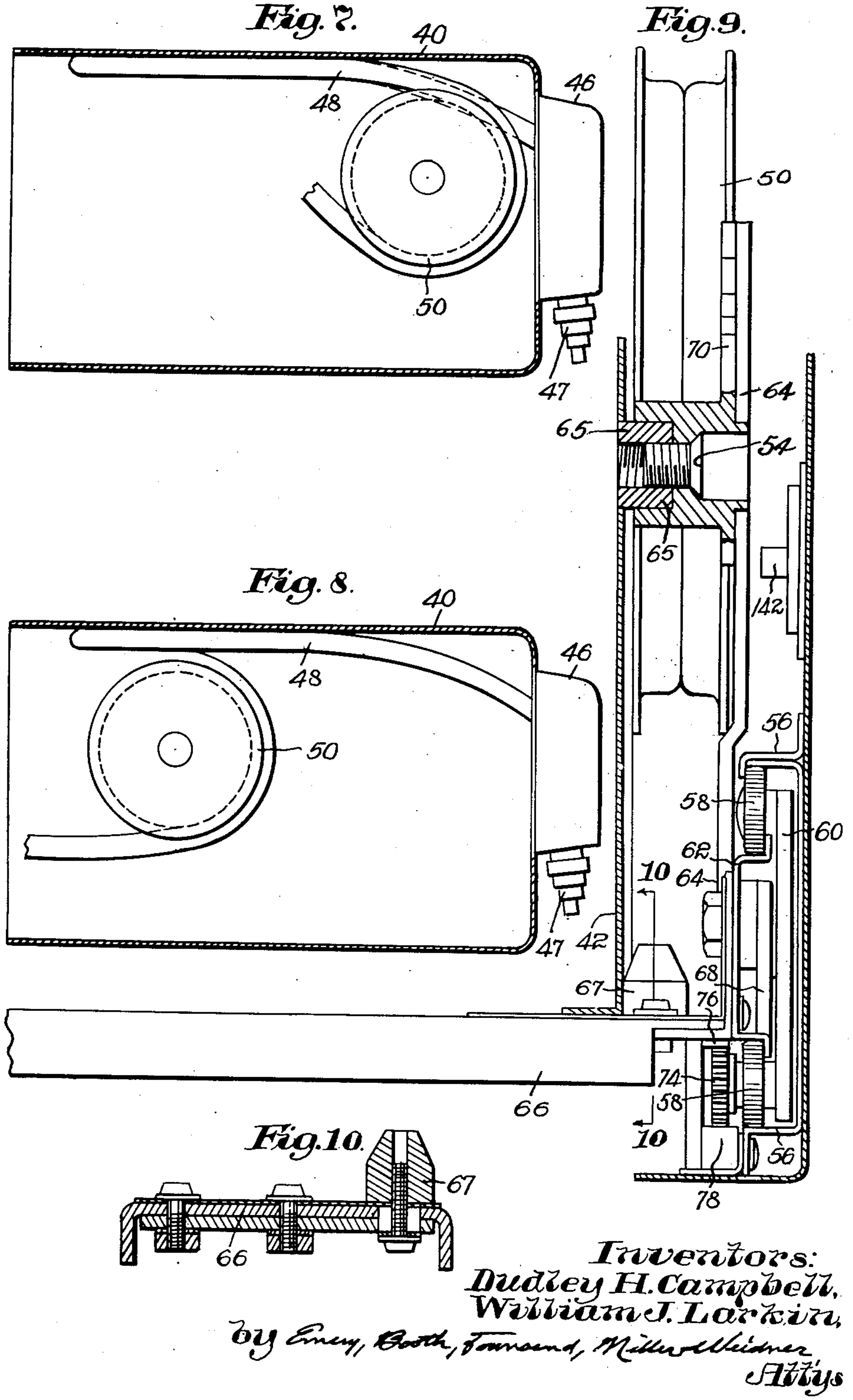
Figs. 7 and 8 are diagrammatic drawings illustrating the operation of the take-up for the conducting cable.
Fig. 9 is a fragmentary view illustrating one of the slide mechanisms which support the chassis as seen from the front.
Fig. 10 is a section on the line 10—10 of Fig. 9.
Figures 11, 12, 13, 14, 15, 16, 17:
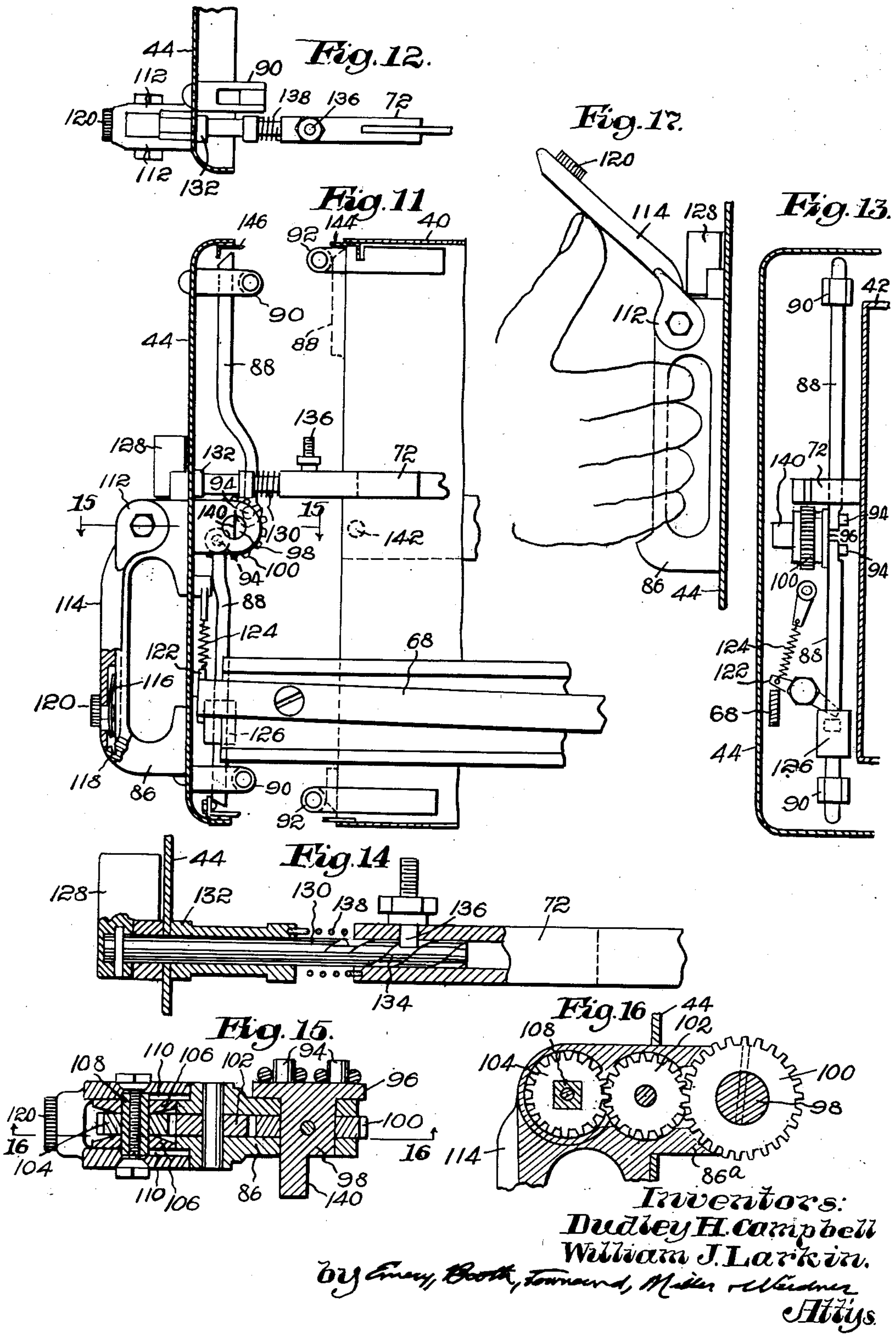
Fig. 11 is a fragmentary view with many parts omitted, in general corresponding to a longitudinal section just outward of one of the handles on the panel and showing the cabinet slightly opened or ajar.
Fig. 12 is a section looking down in Fig. 11 from a plane just below the top wall of the cabinet proper.
Fig. 13 is a rear view of the portion of the drawer front or panel as seen from the right in Fig. 11.
Fig. 14 is a fragmentary longitudinal section on a larger scale of the pivot latch controlling means which appears about centrally of Fig. 11.
Fig. 15 is a section on a larger scale on line 15—15 of Fig. 11.
Fig. 16 is a section on the line 16—16 of Fig. 15.
Fig. 17 is a view corresponding to a portion of Fig. 11 with the parts in a different position.

There will next be described the slide mechanism by which the chassis is supported and permitted to move from within the casing 40 to the position of Fig. 5. Reference will be made particularly to Figs. 9, 10 and 17. It will be understood that the construction shown in Fig. 9 is duplicated on the other side of the cabinet. Referring to that figure, the inner face of the vertical wall of the casing 40 carries upper and lower tracks 56 facing toward each other and guiding the wheels or rollers 58 of an intermediate slide 60 and between these rollers is mounted the flanged channel 62 constituting a side element of a carriage from which the chassis is supported. Herein brackets 64 on these elements 62, which brackets are broken away in Fig. 9 but may be seen complete in Figs. 5 and 6, support the trunnions 65 at the pivotal axis 54 previously referred to, by which trunnions the chassis 42 is pivotally mounted. In Figs. 5 and 6 the numeral 54 is applied to a screw which taps into the trunnion proper (see Fig. 9) and releasably retains the trunnion in its bearing. The center of gravity of the trunnion-supported parts is forward of this axis and in the horizontal position of the chassis it rests on cross-bar 66 which joins the forward ends of the two channels 62, being received between two centering projections 67 thereon having conical upper portions cooperating with the adjacent lower corners of the chassis when it is swung downwardly from the elevated position of Fig. 6 to the position of Fig. 5 and Fig. 9.

When the chassis has been completely withdrawn to the position of Fig. 5, preferably the slide is automatically locked in the extended position, herein by means of the pivoted pawl 68 housed within the concavity of channel 62. The point of this pawl drops down behind a projection 69 on the intermediate slide 60, thus holding the slide mechanism latched in the extended position of Fig. 5 until the pawl is released. The arrangements herein provided for effecting this release will be later described.

Figure 2:
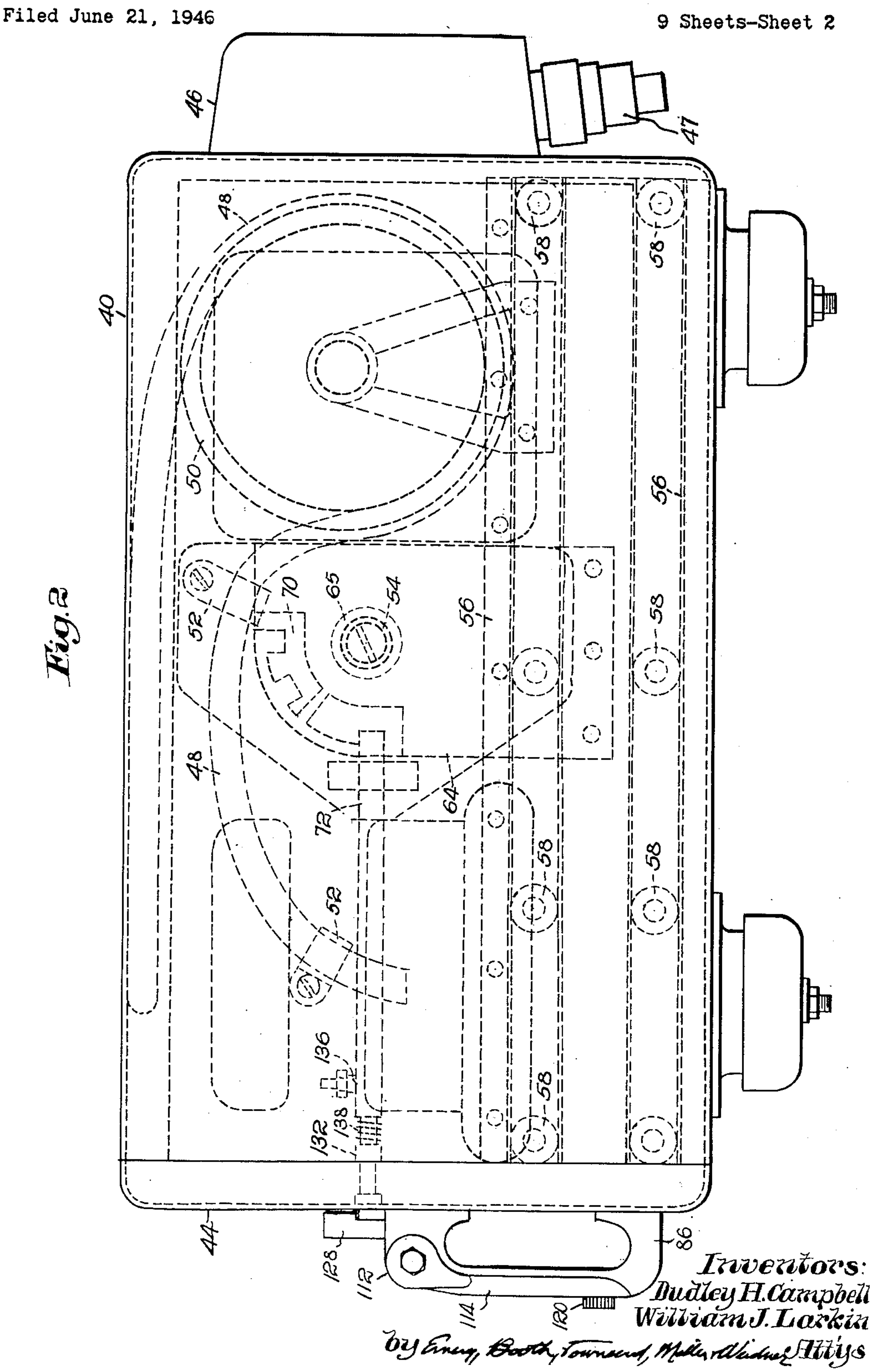
Fig. 2 is a side elevation.

Referring now to Figs. 5 and 6, the chassis when withdrawn from the casing may take three positions without removing it from its carriage, the horizontal position shown in Fig. 5, the vertical position illustrated in full lines in Fig. 6 and the diagonal position illustrated in dotted lines in that figure. The vertical position gives ready access to the bottom of the chassis for work thereon and the diagonal position is designed to give the maximum space between the top of the chassis and the top wall of the open end of the casing 40 for access to the interior of the casing. As best seen in Fig. 2, the bracket 64 carries a sector 70 with locking notches adapted to be engaged by a releasable latch bolt 72 slidably mounted on the side of the chassis and manipulated as hereinafter described to hold the chassis locked in any one of its several angular positions.

Each cable 48 must be long enough to reach to its point of anchorage 52 on the chassis when the latter is withdrawn to the positions of Figs. 5 and 6. Means are provided for controlling the slack of the cable so it is, as it were, neatly coiled up in a vertical plane adjacent the side walls of the cabinet proper 40 and automatically disposed of when the parts are returned to the closed position. The bight of the cable as already described is trained about the pulley 50 which is mounted on the intermediate slide 60. Referring to Fig. 18 in connection with Fig. 9, it will be seen that this intermediate slide carries a pinion 74, herein coaxial with the lower roller 58, which gears with a downwardly presented rack 76 on the carriage slide 62 and an upwardly presented fixed rack 78 associated with the parts which form the lower track 56. Thus when the chassis carriage 62 is drawn out, the intermediate slide 60 moves proportionately thereto, in this instance one-half of the distance. The pulley thus is in effect the moving pulley of a so-called runner tackle of which the standing part is the point of anchorage of the cable to the roof or ceiling of the cabinet 40 and the hauling portion or fall is connected to the moving chassis. With the chassis extended, the pulley has the position of Fig. 8 and as a given length of cable is released by the retreating chassis moving toward the right in that figure, the pulley retreats in one to two ratio toward the position of Fig. 7 one-half of the length of cable being fed around the same into the upper branch of the bight which encircles the pulley. Conversely the pulley feeds out to the fall as the chassis is withdrawn a sufficient amount of cable, one-half of which is drawn from the length which, with the parts in the position of Fig. 7, lies above the same.

Figures 3, 4:
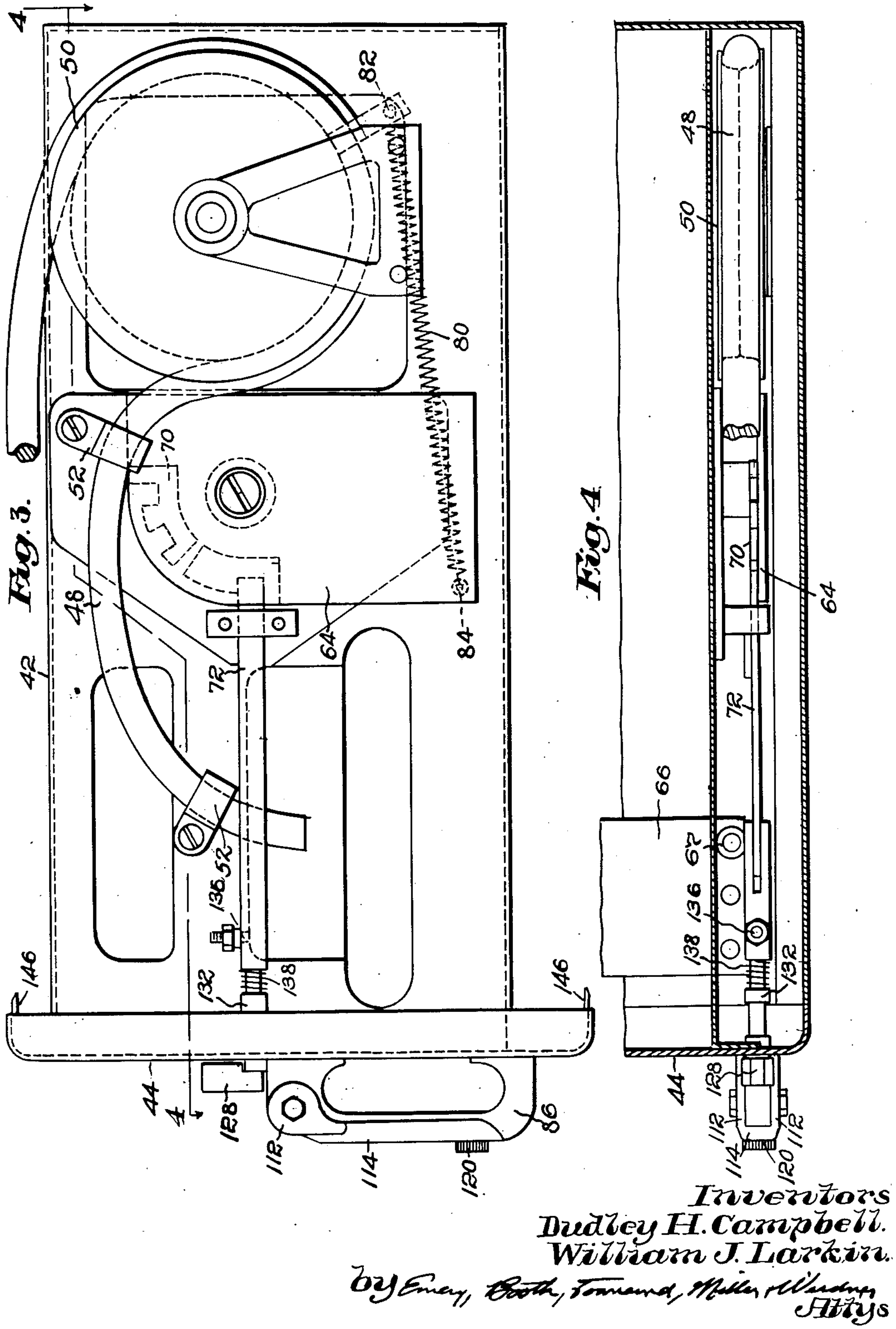
Fig. 3 is a side elevation of the panel and attached chassis removed from the casing proper which encloses the chassis.
Fig. 4 is a section of the nearer side of the cabinet, viewing Fig. 3, on the line 4—4 of that figure.

The cable 43 is relatively inflexible and to compensate for any tendency of the portion thereof between the pulley 50 and the anchorage point 52 to be deflected from the plane thereby defined a lightly tensioned helical spring 80 is here shown secured by clip 82 to the cable and to an anchorage 84 on the movable chassis. When the slide is pulled out and the point 82 leaves the pulley, the spring will hold the fall of the line from lateral deflection while permitting such movements in a vertical plane, viewing Fig. 3, as the action requires.

For moving the chassis back and forth as provided for by the side mechanism, there is provided at either side of the panel (see Figs. 1, 2 and 5) looped bail-like handles 86 into which the fingers of the grasping hand may be inserted to provide a firm control.

Now let us consider the mechanism as installed, for example, on a ship which may be rolling and pitching. The various movable parts should be locked or latched in their various positions of adjustment and when they are shifted manually from one to another, continuous and reliable manual control is required. When the fingers of the hands are grasping the vertical bars of the bail-like handles which stand in spaced relation to the front of the panel to permit the grouped fingers to be freely inserted, such control is effected and herein means are provided for latching or unlatching the various parts, which means may be actuated without releasing the handles 86.

There will next be described the means provided for latching the cabinet in the closed position of Fig. 2, in other words, for latching the panel 44 to the casing 40, and reference will be made particularly to Figs. 11, 12 and 13. See also Fig. 25. The latching of the front panel is effected by pairs of upper and lower latch bolts 88 at either side thereof. These bolts 88 slide in guides 90 (Fig. 25), and when the cabinet is closed engage behind keepers 92 projecting from the casing, as is shown in dotted lines in Fig. 11. In the example of the invention shown these bolts are dead bolts which must be retracted not only to release the latch but also for closing the same. Herein the bolts of each pair are connected at their tails to wrist pins 94 on a crank disc 96, the shaft 98 of which is journalled in an extension 86*a* of the adjacent handle 86 which extends inwardly through the panel. As will be apparent from Fig. 11, if the disc is turned clockwise, viewing that figure, the bolts will be retracted. Means are provided in connection with the handles 86 for manipulation by the fingers of the grasping hand to effect such rocking movement and herein (see particularly Figs. 15 and 16) the shaft 98 carries a pinion 100 driven through an intermediate pinion 102 from a driving pinion 104 located at the front side of the panel. Pinion 104 is rotatably supported by bearing discs 106 in a transverse circular opening formed in the upper portion of the handle (see Fig. 16). A square shaft 108 which extends through the driving pinion 104 and the discs 106 has its ends received in slots 110 in two spaced ears 112 formed on the end of a lever 114, which ears fit over the open ends of the bearing opening in the handle in which the driving pinion 104 and discs 106 are received. This lever in the closed position corresponding to the projected position of the latch bolts 88, as seen in Fig. 11, overlies the grasping portion of the handle 86 and may be somewhat concaved to fit over the same and is preferably recessed thereinto, providing a smooth exterior contour of the closed assembly. The lever may normally be retained in this downward position by a bolt comprising a spring leaf 116 slidably mounted in a recess in the rear of the lever and adapted to be projected into a slot 118 in the handle proper by a thumb button 120 working in a slot in the lower end of the lever and exposed at the outer face thereof. When the lever 114 is raised to the position of Fig. 17, pinion 104 is turned and rotates the crank disc 96 to retract bolts 88.

Figure 1:
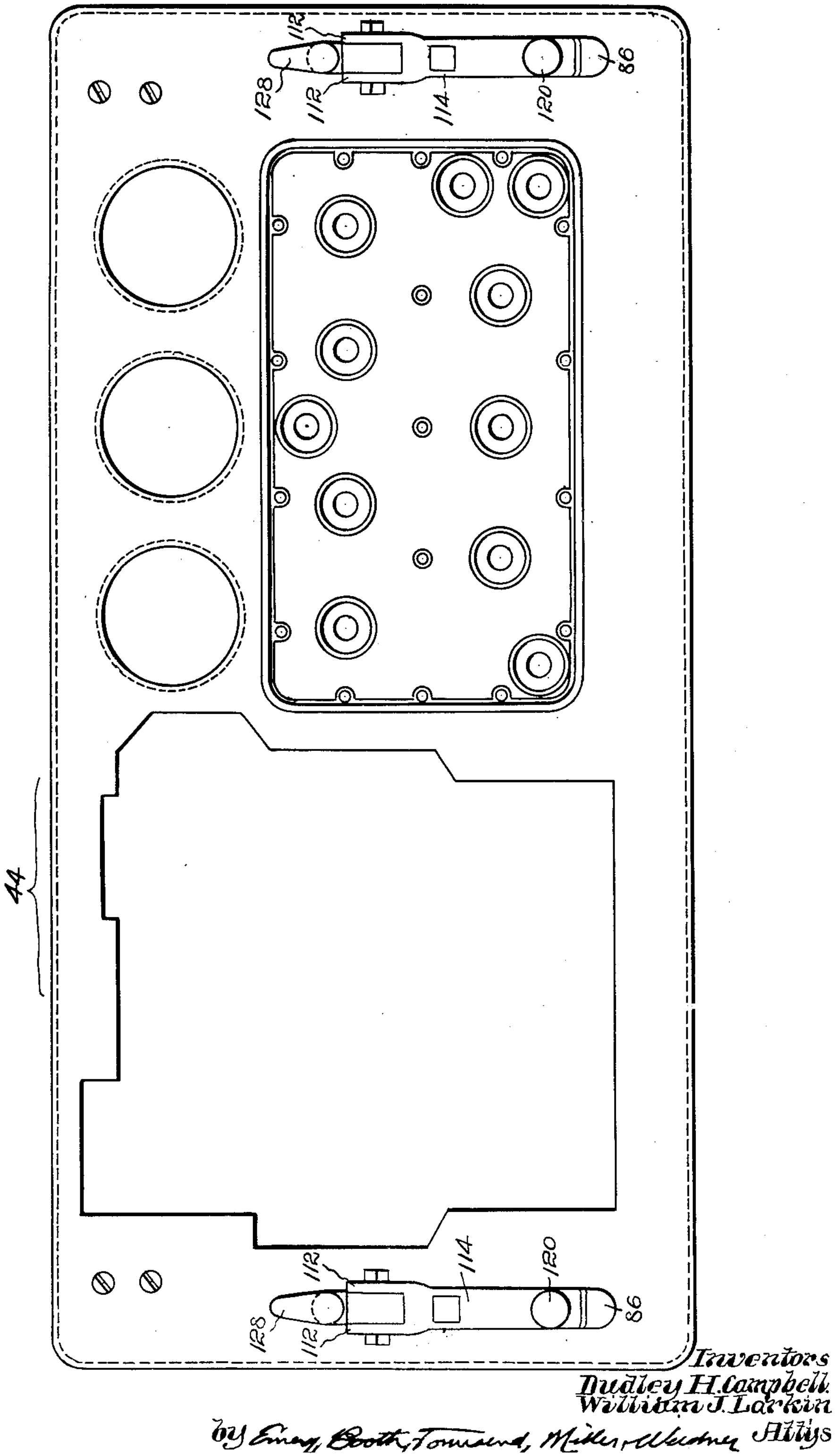
Fig. 1 is a front elevation of the cabinet and shows the panel of the radio installation, omitting the various accessories such as control knobs, indicating instruments and the like, which ordinarily appear on such a panel although the positions where some of these parts are mounted are indicated.

When, with the parts positioned as in Figs. 1 and 2, the fingers are inserted in the loops of the handles 86, then, without releasing their grip, the buttons 120 may be moved upwardly by the thumbs to release levers 114. Still without relaxing the hold on the handles, one at each side, the thumbs may swing the levers up toward the horizontal position and the thumbs may be inserted below the same, as shown in Fig. 17, to provide a powerful thrust on the levers for retracting the latch bolts or to retain them retracted when the slide is to be collapsed. Thus manual control of the moving parts is assured and there is no danger of the mechanism "taking charge," to use the nautical expression.

There has previously been described the pawl or latch 68 which automatically drops into position to hold the slide in the extended position of Fig. 5 when it has been drawn out to its limit. Means are provided for releasing this without letting go of the handles 86. The arrangement herein disclosed will be best understood from Figs. 13 and 25. Opposing the tail or outermost portion of the pawl 68 is a pivoted arm 122 on the inner side of the panel 44 and normally rocked by a spring 124 away from the tail. A collar 126 on the adjacent bolt 88 opposes the other end of this arm and when the bolt is retracted it swings the arm against the spring to depress the tail of the latch pawl 68 (at the left in Fig. 11) to swing the same counterclockwise, viewing Fig. 11, and release its inner end (see Figs. 5 and 6) from the abutment stop 69.

It has already been explained that a latch bolt 72 cooperates with sector 70 (see Fig. 2) to maintain the chassis in any one of the three positions indicated in Figs. 5 and 6. Means are provided whereby this bolt may be retracted to permit the chassis to be moved from one position to another, this means being operable without release of the hands from the handles 86. Referring particularly to Figs. 11 and 14, just above the handles 86 there is provided a thumb lever 128 mounted on a shaft 130 journalled in the handle and extending through a spacing sleeve 132 which projects from the inner face of the front panel 44. With the hand engaged in the loop of handle 86, the thumb may engage and rock thumb lever 128, the shaft 130 of which telescopes into the bolt 72 and is provided with a spiral groove 134 engaged by a pin 136 on the bolt, a spring 138 being interposed between the opposed end of the bolt 72 and sleeve 130. When the thumb lever is rocked, the bolt 72 is retracted by the screw action of the spiral groove to free the bolt from the sector 70 and permit the chassis to be swung about its trunnions by force applied at the handles 86 which remain securely gripped at all times.

Referring particularly to Figs. 11 and 15, it will be seen that the end of shaft 98 opposite the crank disc 96 has a half-round extension 140 which opposes a rounded abutment member 142 at the open front of the casing. When the front of the cabinet is closed and the bolts 88 engaged with their keepers 92, the flat surface lies immediately adjacent this abutment. Now, if the crank disc is rocked to release the bolts, this flat surface acts in the manner of a cam against the abutment 142 to move the panel toward the left, viewing Fig. 11, setting it ajar ready for further withdrawal. This action is of particular advantage as contrasted with merely pulling the cabinet open when the parts are constructed in the manner illustrated more particularly in Figs. 24 through 27 which will next be described.

Referring to Fig. 26 (see also Figs. 22 and 23), the casing 40 is a box of sturdy yet relatively thin metal of generally rectangular form and with an open end while the panel 44 is shaped from similar metal with a short flange and might be said to be a similar box of shallow depth. The extended dimensions of these parts, particularly in the case of the casing 40, provide an opportunity for flexure or warpage and it is desirable that the surfaces should meet accurately in a butt joint, as illustrated in Fig. 27. There are herein shown secured to the inner faces of these opposed edges of casing and panel respectively angle irons 143 and 145 (see Figs. 26 and 27) having their horizontal flanges notched to provide tooth-like projections 144 and 146 in staggered or alternating relation and respectively adapted to enter beneath the opposed edge of the other part between the projections therefrom when the two parts are closed together in the position of Fig. 7 to support the opposed edges and bring them into alignment. It will be seen from Fig. 26 that the ends of these projections are somewhat wedge-shaped or pointed so that they enter easily and if the parts are somewhat out of line bring them into and hold them in accurate alignment. There is thus an interlocking engagement of the casing 40 and its closure formed by the panel 44, as shown in Fig. 26, although the parts are exteriorly smooth, and while the final fit is a tight one, it does not prevent the ready approximation of the parts.

For electrical reasons in the case of such an apparatus as a radio receiver it is desirable that the panel 44 have good electrical contact with the casing 40 to provide a grounding connection. Herein we show in the spaces between the teeth 146 and opposing the teeth 144 angular members 148 which may be of nickel-plated brass having resiliently yieldable, horizontally extending tongues over which the teeth 144 may ride when the parts are approximated to the position of Fig. 26 desirably with some downward flexure of the tongues to insure a tight contact.

When the blister 46 is used, as seen in Fig. 2, it may be in the form of a basin-like shell (see Fig. 18*a*) having a peripheral flange 150, the body of the shell passing through opening 152 in the rear wall of the casing 40 with the flange 150 engaging the inner surface of the wall around the periphery of the opening. The front of the basin-like casing may be closed by a cover plate 154 provided with handles 156 for manipulating the same. When the chassis is withdrawn and tipped to the dotted line position of Fig. 6, a maximum opening at the top between the same and the front end of the casing 40 is provided to permit the blister to be withdrawn or to be inserted in position. To lock it in this position means are provided which may be manipulated from adjacent the open front of the casing. The mechanism herein disclosed for this purpose is most clearly illustrated in Figs. 18 through 23. The flange 150 of the blister and the overlying portion of its cover are provided with notches 158 which are adapted to pass the projections 160 of locking bars 162 slidably mounted on the rear wall of the cabinet at the top and bottom of the opening in the manner illustrated in Fig. 23. After the flange has been moved away from the reader, viewing Fig. 23, past these projections, if the bars 162 are then shifted to the position shown in Fig. 22 the projections 160 will overlie the flange and lock it against the margin of opening 152. The mechanism herein shown whereby these bars are operated will next be described.

Viewing Fig. 22, it will be seen that there is an upper and lower bar at either side of the center and each pair is operated by means disposed inwardly of the adjacent side wall of the casing 40 and but one of these means needs to be described in detail. In Fig. 18 we are viewing the mechanism on the further side of the cabinet. The bars 162 are slidably mounted by pin and slot connections 163 (Figs. 22 and 23) on the rear wall of the casing 40 and are adapted to be reciprocated horizontally, viewing Fig. 22, by a cross-bar 164 connecting the ends which are adjacent the casing wall. This cross-bar 164 (see Fig. 20) has a slot 166 in which works a pin on a crank arm 168, the mechanism being of the type known as a Scotch yoke. As the crank arm swings, the cross-bar 164 is reciprocated and with it the locking bars 162. The shaft 170 which carries the crank arm 168 extends along the adjacent side of the casing 40 (see Fig. 19) and is secured by a coupling sleeve 172 to a short coaxial shaft 174 having an angularly bent crank arm 176 for turning the same, which arm normally lies flat against the side of the casing. As is apparent from Fig. 20, a movement of the crank 168 through 90° effects the maximum reciprocating movement of the locking bars 162. It would not be desirable inadvertently to move the crank past center and inadvertently return the bars to a locking position when it was desired to release them. However, a movement of the operating lever 176 through 180° is desirable so that at either extreme of its movement this may lie conveniently out of the way parallel to the side of the casing. Lost motion between shafts 170 and 174 may therefore be provided by suitable means such, for example, as that shown in Fig. 21 wherein the end of shaft 170 within the sleeve 172 which is secured thereto has a quadrantal projection 178 extending through 135° of angle which is overlapped by a segmental extension of like angular extent on the driving shaft 174. These define between them an empty space of 90° angle. This arrangement permits the latter to turn 180°, 90° of which is lost motion relative to shaft 170 and 90° of which turns the latter shaft.

To hold arm 176 from casual displacement from the position of Figs. 18 and 19 a catch may be provided, herein in the form of a leaf spring 182 having a hole in its end (see Fig. 18) receiving the extreme lower end of the arm 176. This spring may be easily pressed down to free the arm when it is desired to utilize it as a means of rocking shaft 170 for moving the locking bars 162 which retain the blister in position.

We are aware that the invention may be embodied in other specific forms without departing from the spirit or essential attributes thereof, and we therefore desire the present embodiment to be considered in all rspects as illustrative and and not restrictive, as is in fact clear in several matters from the description itself. Reference is to be had to the appended claims to indicate those principles of the invention exemplified by the particular embodiment described and which we desire to secure by Letters Patent.

We claim:

1. A radio apparatus comprising a chassis and a casing telescopically associated in the manner of a drawer and its case, guideways in the casing, extension slides moving on the guideways, a chassis-supporting carriage movable on the slides, racks on the guide and the carriage and a connecting pinion rotatably mounted on the slide, interposed between said racks and meshing therewith, a pulley wheel on the slide and a flexible conductor extending between the chassis and a fixed point of the casing and looped about said pulley wheel.

2. A radio apparatus comprising a chassis and a casing with which the chassis is associated through an intermediate slide in the manner of an extension drawer, a flexible conductor extending between the movable chassis and a fixed point of the casing, a pulley about which the bight of the conductor is looped and means for advancing it differentially to the chassis as the chassis is withdrawn from the casing to pay out the length of conductor, and means for retracting the pulley as the chassis is returned to take up the length of conductor so payed out.

3. A radio apparatus comprising a chassis and a casing within which it is telescopically mounted, a tackle within the casing the flexible element of which tackle is a conductor extending between a fixed point of the casing and the chassis, the tackle including a movable pulley, and means for moving the pulley differentially and proportionately to the movement of the chassis to take up and pay out the length of conductor intervening between said fixed point and the chassis as the chassis is moved.

4. A radio apparatus comprising a chassis and a casing which telescopically receives it in the manner of a drawer, a flexible conductor extending within the casing extending between an interior point thereof and the chassis, a movable member within the casing about which the bight of the conductor is looped operatively associated with the chassis to be moved differentially thereto as the chassis is moved in and out relatively to the casing to take up and pay out the length of conductor intervening between said interior point and the chassis.

5. A radio apparatus comprising a casing, a panel forming a closure therefor, a chassis projecting from the panel, trunnions on the chassis, a carriage having bearings for said trunnions thereby to support the chassis, telescopic extension devices for supporting the carriage from the interior walls of the casing, a sector on the carriage adjacent a trunnion, a bolt on the chassis cooperating with the sector for latching the chassis in selected positions of rotative adjustment, handles at the front of the panel having portions for encirclement by the grasping fingers of the hands, a finger piece accessible to the thumb of a hand grasping a handle for movement by the thumb and connections between said finger piece and the bolt for shifting the latter responsively to movement of the former.

6. A radio apparatus comprising a casing, a panel forming a closure therefor, a chassis projecting from the panel, a carriage on which the chassis is trunnioned, telescopic extension devices for supporting the carriage from the interior walls of the casing, means for latching the chassis in selected positions of angular adjustment on the carriage, handle means at the front of the panel for moving the chassis constructed for prehension by the fingers of a grasping hand and manipulable means for controlling the latching means exposed at the front of the panel within range of a digit of such hand.

7. A radio apparatus comprising a casing, a panel forming a closure therefor, a chassis projecting from the panel, trunnions on the chassis, a carriage having bearings for said trunnions thereby to support the chassis, telescopic extension devices for supporting the carriage from the interior walls of the casing, a sector on the carriage adjacent a trunnion, a sliding bolt on the chassis lockingly engaging the sector in one position of the bolt, a handle on the panel for moving the chassis, a rotary shaft projecting rearwardly from the panel and having a finger piece at the front of the panel for turning the same, and means connecting shaft and bolt to reciprocate the latter on turning of the former.

8. A radio apparatus comprising a chassis and a casing with which the chassis is associated through an intermediate slide in the manner of an extension drawer, a panel carried by the chassis forming a closure for the casing, latches between panel and casing, a latch for holding the chassis in extended position, a handle on the front of the panel for moving the chassis, mechanism for retracting both the first and second mentioned latches and actuating means therefor in close spacial relation to the handle providing for their actuation by the fingers of a hand grasping a handle without release of the latter.

9. A radio apparatus comprising a chassis and a casing with which the chassis is connected through an intermediate slide in the manner of an extension drawer, means whereby the chassis is mounted on the slide for swinging adjustment about a horizontal axis when withdrawn from the casing, a panel carried by the chassis forming a closure for the casing, latches between the panel and casing, a latch for holding the chassis in extended position, and a latch for retaining the chassis in fixed position of angular adjustment about said horizontal axis, a handle on the front of the panel for moving the chassis, mechanism for retracting both the first and second mentioned latches and actuating means therefor in close spacial relation to the handle providing for their actuation by the fingers of a hand grasping a handle without release of the latter.

10. A radio apparatus comprising a casing and a chassis and panel associated with the casing in the manner of a drawer and drawer front respectively with a drawer casing, handles on the panel for moving the chassis in and out relatively to the casing, a abutment within the casing, a pushing element on the rear of the panel cooperating with the abutment to start the chassis out from the casing and a lever in close spacial relation to the handle providing for its operation by the fingers of a hand clasping the handle without release of the latter, said lever being connected to said pushing element for operating the same.

11. In a radio apparatus a sheet metal casing of generally rectangular section having an open end, a panel forming a closure for said end having a flange opposing the wall of the casing edge to edge, at least one of said edges having projecting portions adapted to enter beneath and closely fit within the other, a chassis projecting from the panel and slidably received in the casing, an abutment within the casing, a pushing element on the rear of the panel cooperating with the abutment to start the chassis out from the casing, and a lever in close spacial relation to the handle providing for its operation by the fingers of a hand clasping the handle without release of the latter, said lever being connected to said pushing element for operating the same.

12. In a radio apparatus a sheet metal casing of generally rectangular section having an open end, a panel forming a closure for said end having a flange opposing the wall of the casing edge to edge, a chassis projecting from the panel and slidably received in the casing and relatively staggered fingers secured to the inner surface of the flange and case respectively having bevelled ends to pass beneath the opposing member for aligning and positioning said edges.

13. In a radio apparatus a sheet metal casing of generally rectangular section having an open end, a panel forming a closure for said end having a flange opposing the wall of the casing edge to edge, a chassis projecting from the panel and slidably received in the casing and relatively staggered fingers secured to the inner surfaces of the flange and case respectively having bevelled ends to pass beneath the opposing member for aligning and positioning said edges, and yieldable contact arms in the path of at least certain of the fingers to establish electrical connection between the parts in the closed position.

14. A radio apparatus comprising a chassis and a casing with which the chassis is associated in the manner of a drawer, a panel carried by the chassis forming a closure for the casing, multiple bolts at the back of the panel for locking it closed, a handle on the panel front having a bar spaced therefrom to be encircled by the grasping fingers of the hand, a lever pivoted at one end of the bar to overlie the outer surface of the same in one position and when moved away therefrom adapted to receive on its under side the ball of the thumb of the grasping hand to press the lever away from the bar and transmitting means between the lever and bolts to retract the latter when the lever is so pressed.

15. A radio apparatus comprising a chassis and a casing with which the chassis is associated in the manner of a drawer, a panel carried by the chassis forming a closure for the casing, multiple bolts at the back of the panel for locking it closed, a handle on the panel front having a bar spaced therefrom to be encircled by the grasping fingers of the hand, a lever pivoted at one end of the bar to overlie the outer surface of the same in one position, a catch for holding the lever in such one position, a thumb button for releasing the catch located in range of the thumb of the grasping hand as the hand retains its hold of the bar, said lever when moved from the bar adapted to receive on its under side the ball of the thumb of the grasping hand to press the lever away from the bar and transmitting means between the lever and bolts to retract the latter when the lever is so pressed.

16. A radio apparatus comprising a casing, a panel forming a front closure therefor, a chassis projecting from the panel, extension slide mechanism for supporting the chassis from the interior walls of the casing, the casing having an opening remote from its front end, an auxiliary casing having an open side fitted to said opening, latches within the casing for securing the auxiliary casing, and mechanism within the casing for operating the latches comprising an operating portion adjacent the front of the casing and accessible from the front when the chassis is extended.

17. A radio apparatus comprising a casing, a panel forming a front closure therefor, a chassis projecting from the panel, extension slide mechanism for supporting the chassis from the interior walls of the casing and on which said chassis is pivoted, the casing having an opening remote from its front end, an auxiliary casing having an open side fitted to said opening, latches within the casing for securing the auxiliary casing, mechanism within the casing for operating the latches comprising an operating portion adjacent the front of the casing and accessible from the front when the chassis is extended, and means for locking the chassis when extended from the casing in an upwardly and outwardly slanting position to provide a clearance between the top of the same and the top end of the casing for access to said portion.

18. A radio apparatus comprising a casing, a panel forming a front closure therefor, a chassis projecting from the panel, extension slide mechanism for supporting the chassis from the interior walls of the casing, the casing having an opening remote from its front end, an auxiliary casing having an open side with an outwardly extending flange underlying the inner margin of the opening, latches on the interior wall of the casing to overlie said flange to position the auxiliary casing, and mechanism within the casing for operating the latches comprising an operating portion adjacent the front of the casing and accessible from the front when the chassis is extended.

19. A radio apparatus comprising a casing, a panel forming a front closure therefor, a chassis projecting from the panel, extension slide mechanism for supporting the chassis from the interior walls of the casing, the casing having an opening remote from its front end, an auxiliary casing having an open side with an outwardly extending notched flange underlying the inner margin of the opening, latch bars slidably mounted on the inner wall of the casing having portions adapted in one position to pass through the notches and in another to overlie the flange portions between the notches, a shaft having driving connection to the bars for reciprocating the same and extending along the interior of the casing wall to a point adjacent the front of the same and there having means for turning the same.

20. A radio apparatus comprising a casing, a panel forming a front closure therefor, a chassis projecting from the panel, extension slide mechanism for supporting the chassis from the interior walls of the casing, the casing having an opening remote from its front end, an auxiliary casing having an open side with an outwardly extending notched flange underlying the inner margin of the opening, latch bars slidably mounted on the inner wall of the casing having portions adapted in one position to pass through the notches and in another to overlie the flange portions between the notches, a shaft extending along the interior of the casing wall and having a crank and slotted cross-head connecting it to the bars for reciprocating the same, a driver at the front of the casing for turning the shaft having a radially extending lever and having connection to the shaft permitting lost motion through a quadrant.

DUDLEY H. CAMPBELL.
WILLIAM J. LARKIN.

REFERENCES CITED

The following references are of record in the file of this patent:

UNITED STATES PATENTS

| Number | Name | Date |
|---|---|---|
| 321,078 | Birckhead | June 30, 1885 |
| 357,918 | Gilzinger | Feb. 15, 1887 |
| 958,880 | Lawson | May 24, 1910 |
| 1,228,067 | Severance | May 29, 1917 |
| 1,241,093 | Collings | Sept. 25, 1917 |
| 1,718,374 | Oberst | June 25, 1929 |
| 1,867,145 | Godfrey | July 12, 1932 |
| 2,028,717 | Hayden | Jan. 21, 1936 |
| 2,081,928 | Hay | June 1, 1937 |
| 2,110,433 | Yost | Mar. 8, 1938 |
| 2,171,553 | Hay | Sept. 5, 1939 |
| 2,203,946 | Doescher | June 11, 1940 |
| 2,290,521 | Young et al. | July 21, 1942 |
| 2,372,672 | Hultgren et al. | Apr. 3, 1945 |